(12) United States Patent
Long et al.

(10) Patent No.: US 7,549,697 B1
(45) Date of Patent: Jun. 23, 2009

(54) FISH RECEIVING APPARATUS

(76) Inventors: John A. Long, 2308 W. Lawn Ave., Milwaukee, WI (US) 53209; Fred Rainey, 2308 W. Lawn Ave., Milwaukee, WI (US) 53209

( * ) Notice: Subject to any disclaimer, the term of this patent is extended or adjusted under 35 U.S.C. 154(b) by 0 days.

(21) Appl. No.: 12/017,454

(22) Filed: Jan. 22, 2008

(51) Int. Cl.
*A47C 7/62* (2006.01)
(52) U.S. Cl. .............................. 297/188.13; 297/188.12; 43/56
(58) Field of Classification Search ............ 297/188.09, 297/188.12, 188.13; 43/54.1, 56
See application file for complete search history.

(56) References Cited

U.S. PATENT DOCUMENTS

| 469,107 | A | * | 2/1892 | Weatherly | ........... 297/188.09 X |
|---|---|---|---|---|---|
| 3,751,845 | A | | 8/1973 | Van Leeuwen | |
| 4,379,587 | A | | 4/1983 | Duncan | |
| D362,710 | S | | 9/1995 | Hambrick | |
| D371,185 | S | | 6/1996 | Mullins | |
| 5,755,057 | A | | 5/1998 | Dancer | |
| 5,802,760 | A | | 9/1998 | Campbell | |
| 7,377,071 | B1 | * | 5/2008 | Thompson | ................... 43/56 X |

* cited by examiner

*Primary Examiner*—Anthony D Barfield

(57) ABSTRACT

A fish receiving apparatus includes a housing that has a bottom wall and perimeter wall which is attached to and extends upwardly form the bottom wall. The perimeter wall has an upper edge defining an access opening into an interior space of the housing. The perimeter wall has a fill opening extending therethrough. A cover is removably positioned on the housing and covers the opening. The cover defines a platform for sitting on. A chute is attached to the peripheral wall and is in communication with the fill opening. The chute is angled downwardly toward the fill opening. Fish dropped into the chute fall into the interior space through the fill opening.

6 Claims, 3 Drawing Sheets

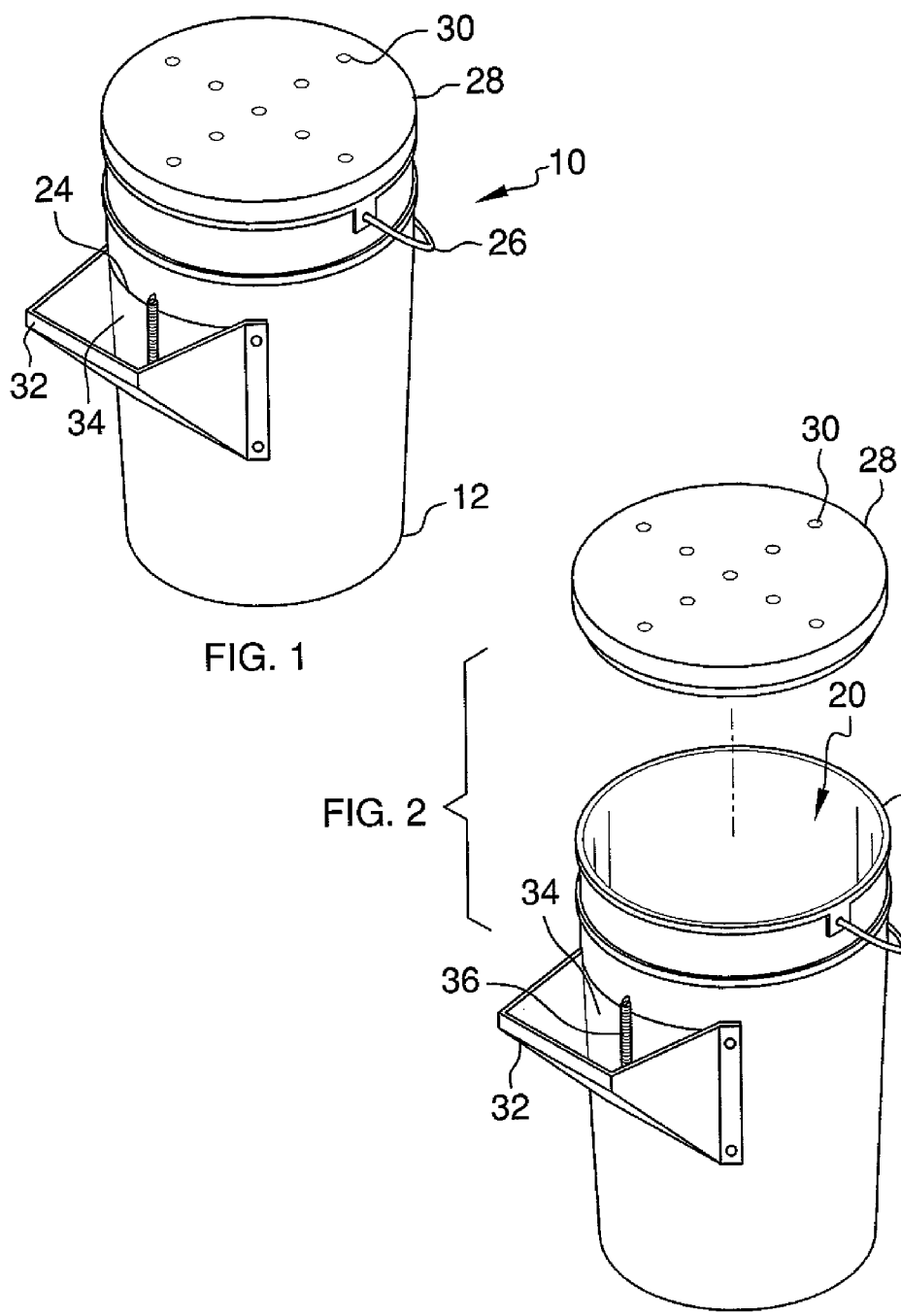

FISH RECEIVING APPARATUS

BACKGROUND OF THE INVENTION

Field of the Invention

The present invention relates to fish holding devices and more particularly pertains to a new fish holding device for holding a plurality of fish after the fish are caught and wherein the device may also be used as a sitting stool.

SUMMARY OF THE INVENTION

The present invention meets the needs presented above by generally comprising a housing that has a bottom wall and perimeter wall which is attached to and extends upwardly form the bottom wall. The perimeter wall has an upper edge defining an access opening into an interior space of the housing. The perimeter wall has a fill opening extending therethrough. A cover is removably positioned on the housing and covers the opening. The cover defines a platform for sitting on. A chute is attached to the peripheral wall and is in communication with the fill opening. The chute is angled downwardly toward the fill opening. Fish dropped into the chute fall into the interior space through the fill opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top perspective view of a fish receiving apparatus according to the present invention.

FIG. 2 is a perspective expanded view of the present invention.

DESCRIPTION OF THE PREFERRED EMBODIMENT

Figure 3:
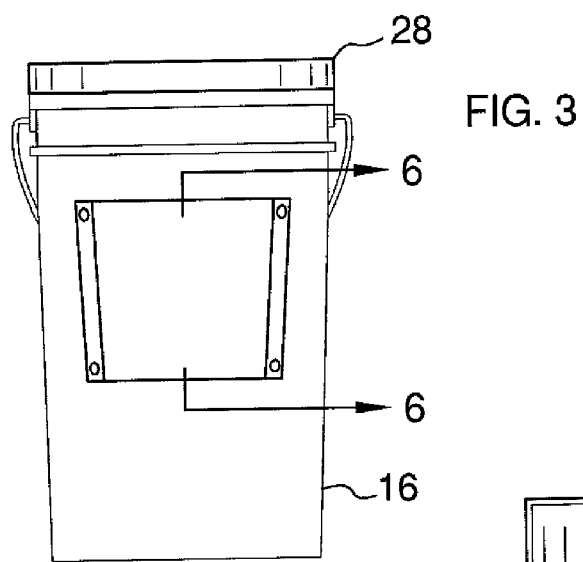
FIG. 3 is a side view of the present invention.
Figure 4:
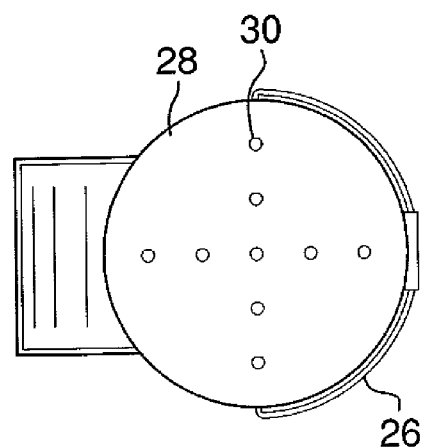
FIG. 4 is a top view of the present invention.
Figure 5:
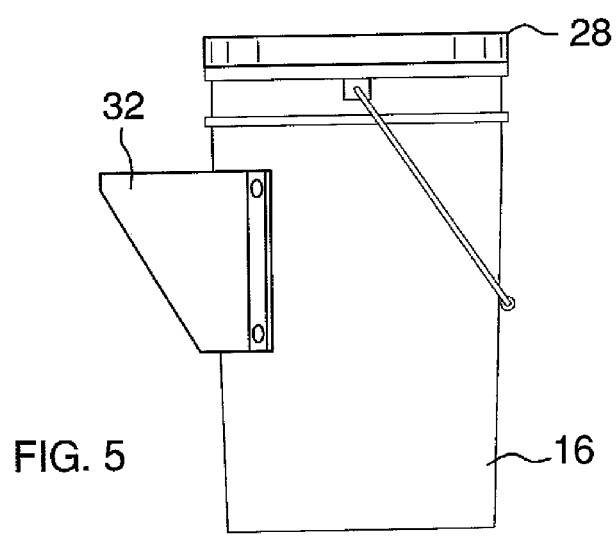
FIG. 5 is a side view of the present invention.
Figure 6:
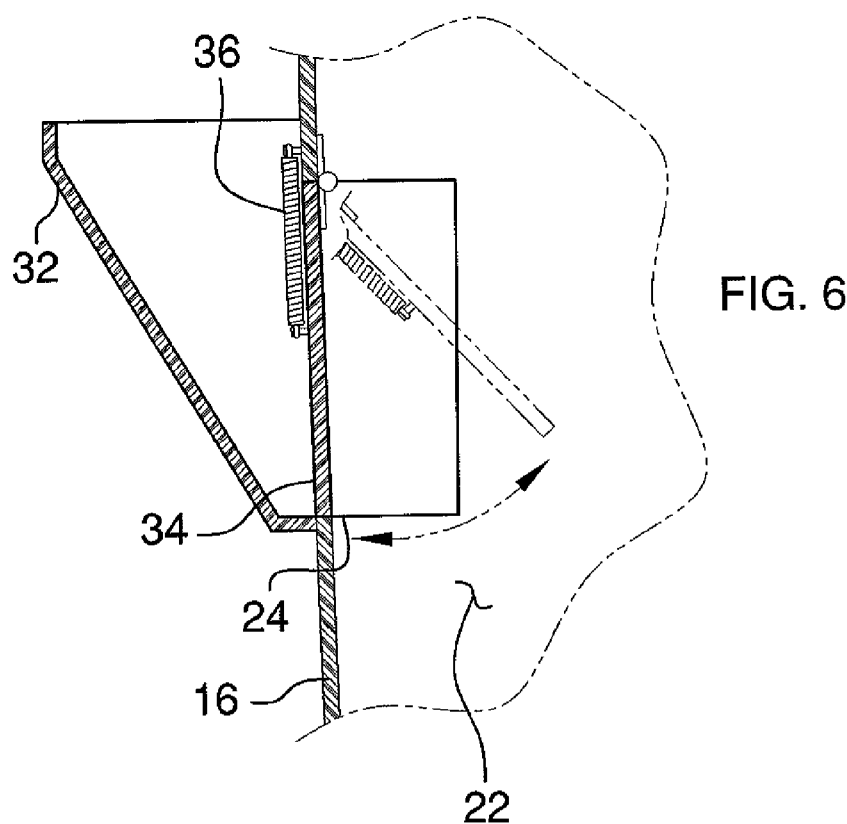
FIG. 6 is a cross-sectional view taken along line 6-6 of FIG. 3 of the present invention.
Figure 7:
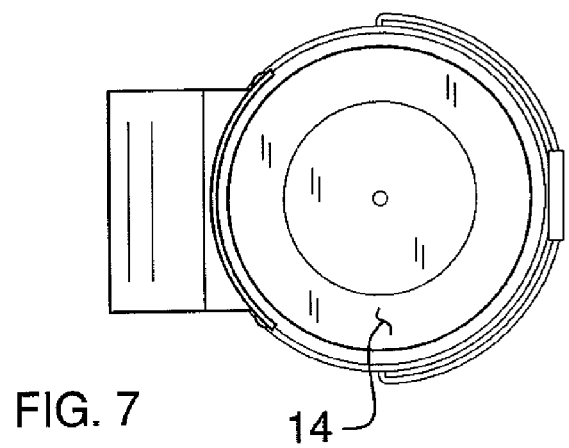
FIG. 7 is a bottom view of the present invention.

With reference now to the drawings, and in particular to FIGS. 1 through 7 thereof, a new fish holding device embodying the principles and concepts of the present invention and generally designated by the reference numeral 10 will be described.

As best illustrated in FIGS. 1 through 7, the fish receiving apparatus 10 generally comprises a housing 12 that has a bottom wall 14 and perimeter wall 16 that is attached to an extends upwardly form the bottom wall 14. The perimeter wall 16 has an upper edge 18 defining an access opening 20 into an interior space 22 of the housing 12. The perimeter wall 16 has a fill opening 24 extending therethrough. The fill opening 24 is positioned nearer to the upper edge 18 than the bottom wall 14. A handle 26 is hingedly coupled to the housing 12 to assist a person in lifting the housing 12.

A cover 28 is removably positioned on the housing 12 and covers the access opening 20. The cover 28 defines a platform for sitting on by a user to the apparatus 10. The cover 28 has a plurality of apertures 30 extending therethrough to provide ventilation into the interior space 22.

A chute 32 is attached to the peripheral wall 16 and is in communication with the fill opening 24. The chute 32 is angled downwardly toward the fill opening 24. Fish dropped into the chute fall 32 into the interior space 22 through the fill opening 24.

A door 34 is hingedly coupled to the perimeter wall 16 and covers the fill opening 24. The door 34 prevents the spillage of water and escape of fish outwardly through the fill opening 24. A biasing member 36 biases the door 34 into a closed position. The biasing member 36 comprises a spring that is attached to and extends between the perimeter wall 16 and the door 34.

In use, the housing 12 is partially filled with water and the user of the apparatus 10 sits on the cover 28 while fishing. When a fish is caught, the fish is removed from the fishing line and dropped into the chute 32 so that fish falls into the housing 12. The chute 32 allows the fish to be placed in the housing 12 without the cover 28 having to be removed and therefore the user need not stand up.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fish holding and sitting stool combination assembly comprising:

a housing having a bottom wall and perimeter wall being attached to and extending upwardly form said bottom wall, said perimeter wall having an upper edge defining an access opening into an interior space of said housing, said perimeter wall having a fill opening extending therethrough;

a cover being removably positioned on said housing and covering said access opening, said cover defining a platform for sitting on;

a chute being attached to said peripheral wall and being in communication with said fill opening, said chute being angled downwardly toward said fill opening, wherein fish dropped into said chute fall into said interior space through said fill opening;

a door being hingedly coupled to said perimeter wall and covering said fill opening; and a biasing member biasing said door into a closed position.

2. The assembly according to claim 1, wherein said fill opening is positioned nearer to said upper edge than said bottom wall.

3. The assembly according to claim 1, wherein said cover has a plurality of apertures extending therethrough.

4. The assembly according to claim 1, wherein said biasing member comprises a spring being attached to and extending between said perimeter wall and said door.

5. The assembly according to claim 1, further including a handle being hingedly coupled to said housing.

6. A fish holding and sitting stool combination assembly comprising:

a housing having a bottom wall and perimeter wall being attached to and extending upwardly form said bottom wall, said perimeter wall having an upper edge defining an access opening into an interior space of said housing, said perimeter wall having a fill opening extending therethrough, said fill opening being positioned nearer to said upper edge than said bottom wall;

a cover being removably positioned on said housing and covering said access opening, said cover defining a platform for sitting on, said cover having a plurality of apertures extending therethrough;

a chute being attached to said peripheral wall and being in communication with said fill opening, said chute being angled downwardly toward said fill opening, wherein fish dropped into said chute fall into said interior space through said fill opening;

a door being hingedly coupled to said perimeter wall and covering said fill opening;

a biasing member biasing said door into a closed position, said biasing member comprising a spring being attached to and extending between said perimeter wall and said door; and a handle being hingedly coupled to said housing.

\* \* \* \* \*